United States Patent
Chao

(10) Patent No.: US 10,162,648 B2
(45) Date of Patent: Dec. 25, 2018

(54) METHODS FOR DYNAMICALLY SELECTING A BOOTING OPERATING SYSTEM AND APPARATUSES USING THE SAME

(71) Applicant: Wistron Corp., New Taipei (TW)

(72) Inventor: Shu-Lin Chao, New Taipei (TW)

(73) Assignee: Wistron Corp., New Taipei (TW)

( * ) Notice: Subject to any disclaimer, the term of this patent is extended or adjusted under 35 U.S.C. 154(b) by 134 days.

(21) Appl. No.: 14/556,039

(22) Filed: Nov. 28, 2014

(65) Prior Publication Data
US 2015/0268964 A1  Sep. 24, 2015

(30) Foreign Application Priority Data
Mar. 18, 2014  (TW) .............................. 103110056 A

(51) Int. Cl.
*G06F 9/44* (2018.01)
*G06F 9/4401* (2018.01)

(52) U.S. Cl.
CPC ............ *G06F 9/441* (2013.01); *G06F 9/4408* (2013.01)

(58) Field of Classification Search
CPC .......... G06F 9/44; G06F 9/441; G06F 9/4403; G06F 9/4406; G06F 9/4408
See application file for complete search history.

(56) References Cited

U.S. PATENT DOCUMENTS

| | | | | |
|---|---|---|---|---|
| 6,079,016 A | * | 6/2000 | Park | G06F 9/441 710/10 |
| 6,456,135 B1 | * | 9/2002 | Albean | H04N 5/4401 327/142 |
| 7,966,486 B2 | * | 6/2011 | Huang | G06F 11/1417 710/316 |
| 2006/0212550 A1 | * | 9/2006 | Oda | G06F 9/4411 709/220 |
| 2008/0010446 A1 | * | 1/2008 | Kim | G06F 9/441 713/2 |

FOREIGN PATENT DOCUMENTS

| | | |
|---|---|---|
| CN | 101105755 A | 1/2008 |
| CN | 101840341 A | 9/2010 |
| CN | 103294469 A | 9/2013 |
| EP | 2555110 A1 | 11/2014 |
| TW | 200925995 A | 6/2009 |
| TW | 201027431 A1 | 7/2010 |

OTHER PUBLICATIONS

Taiwan Patent Office, Office Action, Patent Application Serial No. 103110056, dated Jun. 24, 2015, Taiwan.

* cited by examiner

*Primary Examiner* — Fahmida Rahman

(57) ABSTRACT

The invention introduces a method for dynamically selecting a booting OS (Operating System), executed by a micro-controller of an apparatus, which contains at least the following steps. The micro-controller detects a selection signal output from a selection unit, and determines which one of two ROMs (Read-Only Memories) is to be activated accordingly. After a CS (Chip Select) signal of the determined ROM is asserted, a firmware stored in the determined ROM is loaded and executed, and an OS corresponding to the firmware, which is stored in a storage device, is loaded and executed.

8 Claims, 4 Drawing Sheets

METHODS FOR DYNAMICALLY SELECTING A BOOTING OPERATING SYSTEM AND APPARATUSES USING THE SAME

CROSS REFERENCE TO RELATED APPLICATIONS

This Application claims priority of Taiwan Patent Application No. 103110056, filed on Mar. 18, 2014, the entirety of which is incorporated by reference herein.

BACKGROUND

Technical Field

The present invention relates to the system booting, and in particular, to methods for dynamically selecting a booting OS (Operating System) and apparatuses using the same.

Description of the Related Art

Before an OS running in a typical portable device is loaded, a relevant firmware should be executed to configure the hardware environment. However, only one OS is stored in the portable device before leaving the manufacturing factory. When wanting to change the OS, a user needs to download the desired OS and update the firmware, resulting in inconvenience experience for the user. In addition, it bears certain a level of risk when updating the firmware. If the update fails, the portable device might malfunction and cannot be restored to run the original OS. Thus, it is desirable to have a method for dynamically selecting a booting OS and apparatuses using the same to eliminate the aforementioned risk and improve user convenience when the OS is changed.

BRIEF SUMMARY

An embodiment of the invention introduces a method for dynamically selecting a booting OS (Operating System), executed by a micro-controller of an apparatus, which contains at least the following steps. The micro-controller detects a selection signal output from a selection unit, and determines which one of two ROMs (Read-Only Memories) is to be activated accordingly. After a CS (Chip Select) signal of the determined ROM is asserted, a firmware stored in the determined ROM is loaded and executed, and an OS corresponding to the firmware, which is stored in a storage device, is loaded and executed.

An embodiment of the invention introduces an apparatus for dynamically selecting a booting OS, which contains at least a selection unit and a micro-controller. The micro-controller, coupled to the selection unit, detects a selection signal output from a selection unit; determines which one of two ROMs is to be activated accordingly; asserts a CS signal of the determined ROM; loads and executes a firmware stored in the determined ROM; and loads and executing an OS corresponding to the firmware, which is stored in a storage device.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
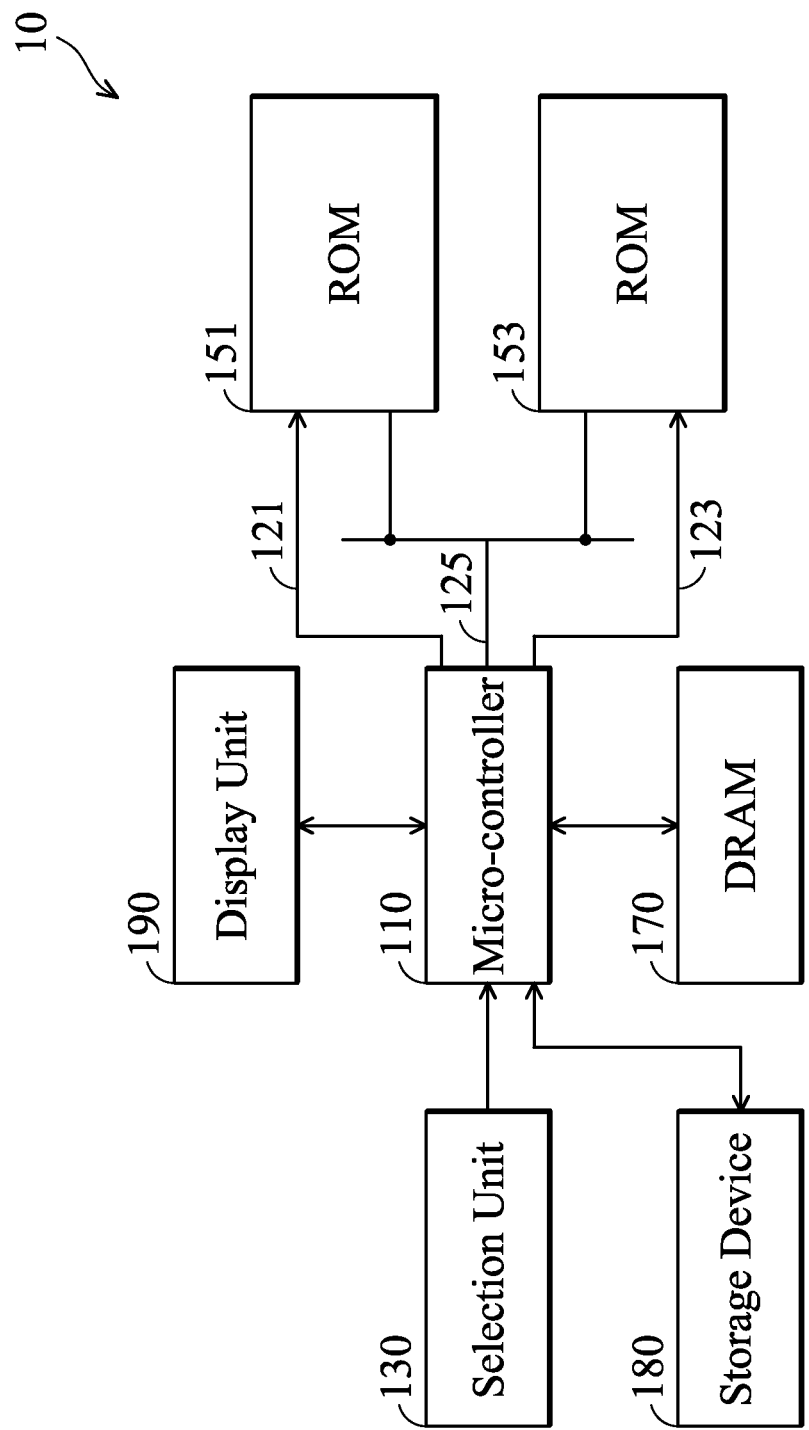
FIG. 1 is the system architecture of an electronic device according to an embodiment of the invention.

FIG. 1 is the system architecture of an electronic device according to an embodiment of the invention. The system architecture may be practiced in a mobile phone, a tablet computer, or a notebook computer, which at least includes a micro-controller 110. The micro-controller 110 can be implemented in numerous ways, such as with dedicated hardware, or with general-purpose hardware (e.g., a single processor, multiple processors or graphics micro-controllers capable of parallel computations, or others) that is programmed using microcode or software instructions when executing a boot loader, a firmware, an OS, and applications to perform the functions recited herein. The apparatus 10 is equipped with two ROMs (Read-Only Memories) 151 and 153. One of the ROMs 151 and 153 stores the initial program (the so-called boot loader) that runs when the apparatus 10 is powered on or otherwise begins execution (a process known as "booting"). The ROMs 151 and 153 store different sorts of OS and firmware. The OS running on the micro-controller 110 performs basic tasks, such as starting the system, handling interrupts, managing execution threads, writing/reading data to/from the DRAM 170, transmitting data to the display unit 190 via driving circuits (not shown), and managing the memory space in the DRAM 170. The OS controls I/O (Input/Output) devices, such as the display unit 190, the DRAM 170, etc., via the firmware. For example, the storage device 180 may store the Google® Android® OS and the Microsoft® Windows® OS, the ROM 151 may store the IA firmware corresponding to the Google® Android® OS, and the ROM 153 may store the UEFI (Unified Extensible Firmware Interface) firmware corresponding to the Microsoft® Windows® OS. The above list of the OS and the firmware is not exhaustive, and the invention should not be limited thereto. It should be appreciated by those skilled in the art that more than three ROMs may be equipped in the apparatus 10 to store more than three different sorts of firmware. The micro-controller 110 uses independent CS (Chip Select) signals 121 and 123 to select the connected ROMs 151 and 153 respectively, and then reads the firmware from one selected ROM via a shared data line 125. It should be understood that the other ROM likely disappears from the system and any data stored therein cannot be accessed.

Figure 2A:
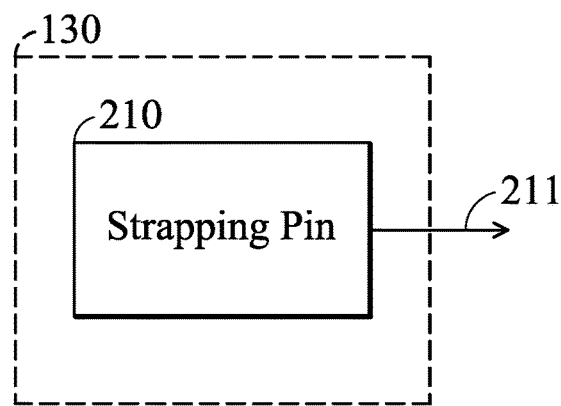
FIG. 2A depicts the block diagram of a selection unit according to an embodiment of the invention.
Figure 2B:
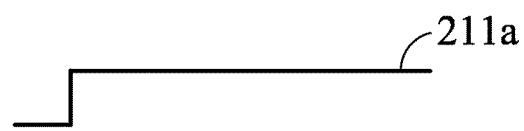
FIGS. 2B and 2C are schematic diagrams of selection signals according to an embodiment of the invention.
Figure 2C:
Figure 3A:
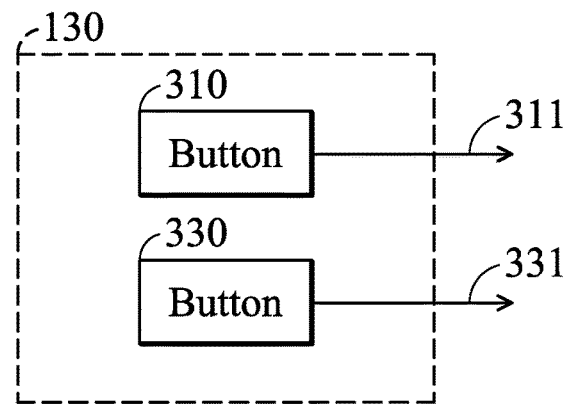
FIG. 3A depicts the block diagram of a selection unit according to an embodiment of the invention.
Figure 3B:
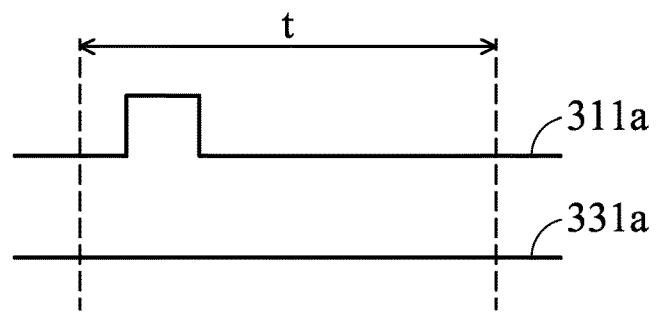
FIGS. 3B and 3C are schematic diagrams of selection signals according to an embodiment of the invention.
Figure 3C:
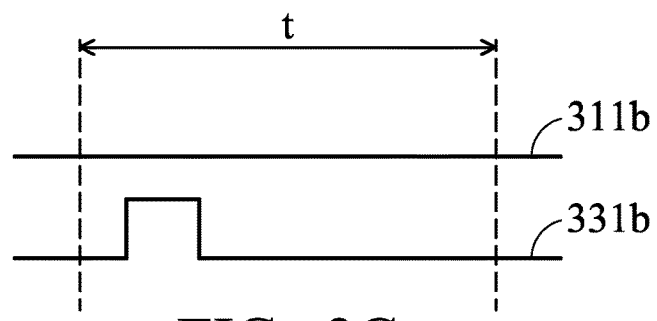

The apparatus 10 further includes a selection unit 130, coupled to the micro-controller 110, for selecting one OS to be loaded by a user. FIG. 2A depicts the block diagram of a selection unit according to an embodiment of the invention. The selection unit 130 may include a strapping pin 210 for generating a selection signal 211 according to position where a pin is placed. FIGS. 2B and 2C are schematic diagrams of selection signals according to an embodiment of the invention. When a user place the pin at a first position, as shown in FIG. 2B, the logic level "1" of a selection signal 211a is generated to indicate a selection to the first sort of OS, such as the Google® Android® OS. When a user place the pin at a second position, as shown in FIG. 2C, the logic level "0" of a selection signal 211b is generated to indicate a selection to the second sort of OS, such as the Microsoft® Windows® OS. FIG. 3A depicts the block diagram of a selection unit according to an embodiment of the invention. The selection unit 130 may include two buttons 310 and 330 for generating selection signals 311 and 331. FIGS. 3B and 3C are schematic diagrams of selection signals according to an embodiment of the invention. During a detection time period t, when a user presses the button 310, as shown in FIG. 3B, a toggling happens on the selection signal 311, for example the selection signal 311a, to indicate selection of the first sort of OS, such as the Google® Android® OS. During a detection time period t, when the user presses the button 330, as shown in FIG. 3C, a toggling happens on the selection signal 331, for example the selection signal 331b, to indicate selection of the second sort of OS, such as the Microsoft® Windows® OS.

When the apparatus 10 is powered on or otherwise begins execution, the micro-controller 10 first loads and executes the boot loader from the default ROM 151 or 153 to complete the following functionality for dynamically selecting an OS when booting. The micro-controller 110 detects a selection signal outputted from the selection unit, such as the selection signal 211, 311 or 331, and determines which of the ROMs 151 and 153 is to be activated according to the selection signal. Subsequently, the micro-controller 110 asserts the CS signal 121 or 123 of the determined ROM, loads the firmware stored in the determined ROM via the shared data line 125, and executes the loaded firmware to complete the initiation for the relevant hardware of the apparatus 10. Finally, the OS corresponding to the executed firmware is loaded from the storage device 180, and the loaded OS is executed. The booting is finished when the OS is successfully executed.

Figure 4:
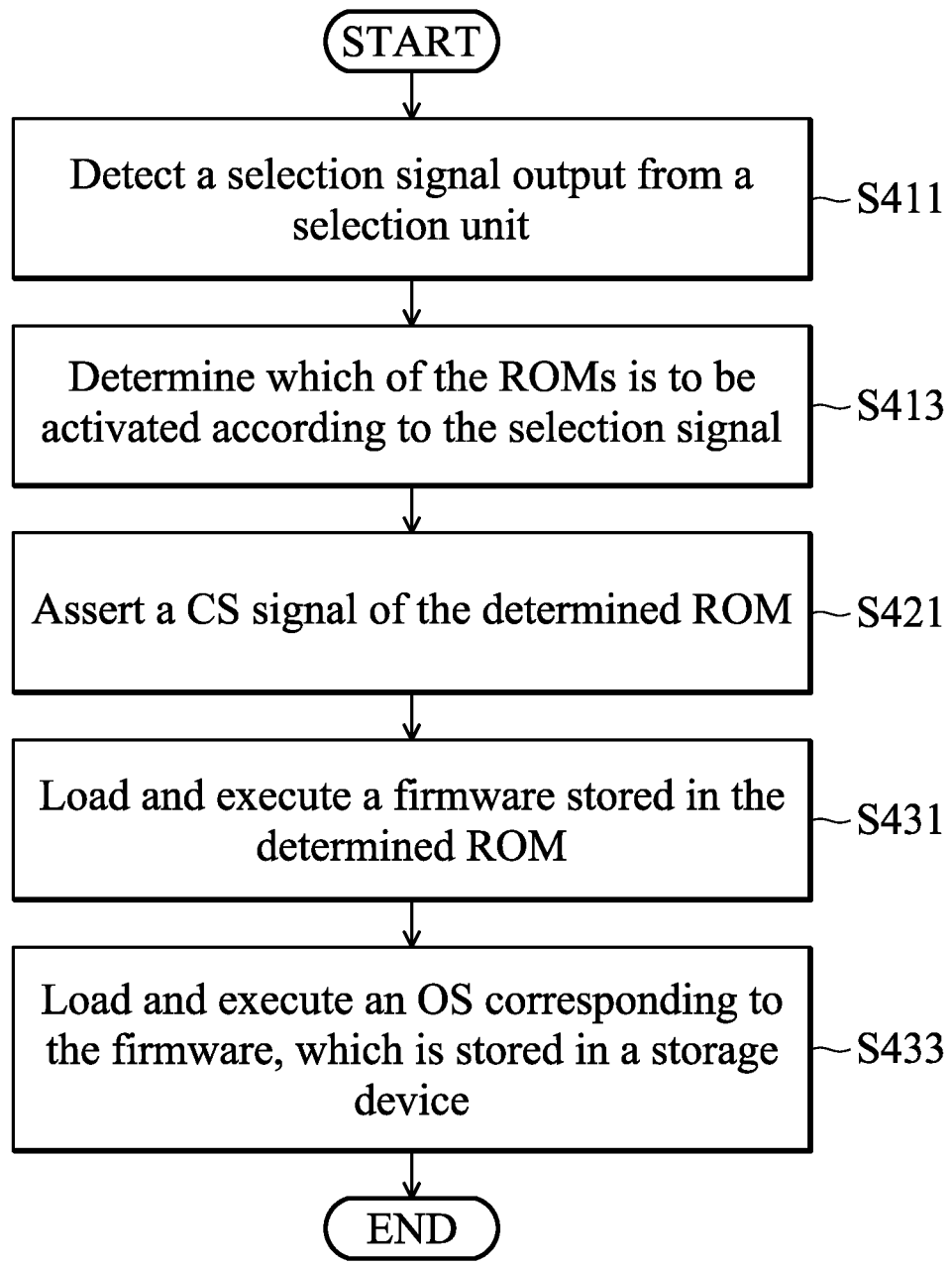
FIG. 4 is a flowchart illustrating a method for dynamically selecting a booting OS, executed by the micro-controller, according to an embodiment of the invention.

FIG. 4 is a flowchart illustrating a method for dynamically selecting a booting OS, executed by the micro-controller 110, according to an embodiment of the invention. First, a selection signal output from the selection unit 130, such as the selection signal 211 corresponding to the strapping pin 210, or the selection signals 311 and 331 corresponding to the buttons 310 and 330 respectively, is detected (step S411). Subsequently, it is determined which of the ROMs 151 and 153 is to be activated according to the selection signal (step S413). For example, when the output corresponding to the strapping pin 210 is shaped like the selection signal 221a as shown in FIG. 2B, the micro-controller 110 determines to activate the ROM 151; and when the output corresponding to the strapping pin 210 is shaped like the selection signal 221b as shown in FIG. 2C, the micro-controller 110 determines to activate the ROM 153. Taking another example for illustration, during a detection time period t, when detecting that the outputs corresponding to the buttons 310 and 330 are the selection signals 311a and 331a respectively as shown in FIG. 3B, the micro-controller 110 determines to activate the ROM 151; and when detecting that the outputs corresponding to the buttons 310 and 330 are the selection signals 311b and 331b respectively as shown in FIG. 3C, the micro-controller 110 determines to activate the ROM 153. Subsequently, the micro-controller asserts the CS signal 121 or 123 of the determined ROM (step S421), loads the firmware stored in the determined ROM via the shared data line 125 and executes the loaded firmware to complete the initiation for the relevant hardware of the apparatus 10 (step S431), and loads the OS corresponding to the executed firmware from the storage device 180 and executes the loaded OS to complete the whole booting (step S433). For example, when the ROM 151 is determined to activate, the IA firmware and the Google® Android® OS are loaded and executed in sequence. In another example, when the ROM 153 is determined to activate, the UEFI firmware and the Microsoft® Windows® OS are loaded and executed in sequence.

Although the embodiment has been described as having specific elements in FIGS. 1, 2A and 3A, it should be noted that additional elements may be included to achieve better performance without departing from the spirit of the invention. While the process flow described in FIG. 4 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically selecting a booting OS (Operating System), executed by a micro-controller of an apparatus, comprising:

detecting a selection signal output from a selection unit;

determining which one of a first ROM (Read-Only Memory) and a second ROM is to be activated according to the selection signal, wherein the first ROM stores first firmware corresponding to a first OS, and the second ROM stores second firmware corresponding to a second OS having configurations different from those of the first OS;

asserting a CS (Chip Select) signal of the determined ROM by the micro-controller, wherein the asserted CS signal is one of a first CS signal of the first ROM and a second CS signal of the second ROM;

loading and executing a firmware stored in the determined ROM via a shared data line between the first ROM and the second ROM based on the asserted CS signal, wherein the first ROM and the second ROM are connected to the micro-controller via the shared data line;

initiating hardware of the apparatus by the first firmware or the second firmware corresponding to the determined ROM; and loading and executing the first OS or the second OS corresponding to the executed firmware in response to the hardware of the apparatus having been initiated by the first firmware or the second firmware, wherein the first OS and the second OS are stored in a storage device, wherein the selection signal is indicated by a logic level or a toggling, wherein the ROM other than the determined ROM is disabled, and data of the ROM other than the determined ROM cannot be accessed.

2. The method of claim 1, wherein the selection unit comprises a strapping pin.

3. The method of claim 2, wherein the determining step further comprises:

when detecting that the selection signal corresponding to the strapping pin is at a first logic level, determining to activate the first ROM; and when detecting that the selection signal corresponding to the strapping pin is at a second logic level, determining to activate the second ROM.

4. The method of claim 1, wherein the selection unit comprises a first button and a second button.

5. The method of claim 4, wherein the determining step further comprises:

during a detection time period, when detecting with the selection signal corresponding to the first button comprises the toggling, determining to activate the first ROM; and when detecting the selection signal corresponding to the second button comprises the toggling, determining to activate the second ROM.

6. An apparatus for dynamically selecting a booting OS (Operating System), comprising:

a strapping pin; and a micro-controller, coupled to the strapping pin, and configured for:

detecting a selection signal output from the strapping pin;

determining which one of a first ROM (Read-Only Memory) and a second ROM is to be activated according to the selection signal, wherein the first ROM stores first firmware corresponding to a first OS, and the second ROM stores second firmware corresponding to a second OS having configurations different from those of the first OS;

asserting a CS (Chip Select) signal of the determined ROM, wherein the asserted CS signal is one of a first CS signal of the first ROM and a second CS signal of the second ROM;

loading and executing a firmware stored in the determined ROM via a shared data line between the first ROM and the second ROM based on the asserted CS signal, wherein the first ROM and the second ROM are connected to the micro-controller via the shared data line;

initiating hardware of the apparatus by the first firmware or the second firmware corresponding to the determined ROM; and loading and executing the first OS or the second OS corresponding to the executed firmware in response to the hardware of the apparatus having been initiated by the first firmware or the second firmware, wherein the first OS and the second OS are stored in a storage device, wherein the ROM other than the determined ROM is disabled, and data of the ROM other than the determined ROM cannot be accessed.

7. The apparatus of claim 6, wherein the micro-controller, when detecting that the selection signal corresponding to the strapping pin is at a first logic level, determines to activate the first ROM; and, when detecting that the selection signal corresponding to the strapping pin is at a second logic level, determines to activate the second ROM.

8. An apparatus for dynamically selecting a booting OS (Operating System), comprising:

a selection unit comprising a first button and a second button; and a micro-controller, coupled to the selection unit, and configured for:

detecting a selection signal output from the selection unit;

determining which one of a first ROM (Read-Only Memory) and a second ROM is to be activated according to the selection signal, wherein the first ROM stores first firmware corresponding to a first OS, and the second ROM stores second firmware corresponding to a second OS having configurations different from those of the first OS;

asserting a CS (Chip Select) signal of the determined ROM, wherein the asserted CS signal is one of a first CS signal of the first ROM and a second CS signal of the second ROM;

loading and executing a firmware stored in the determined ROM via a shared data line between the first ROM and the second ROM based on the asserted CS signal, wherein the first ROM and the second ROM are connected to the micro-controller via the shared data line;

initiating hardware of the apparatus by the first firmware or the second firmware corresponding to the determined ROM; and loading and executing a first OS or a second OS corresponding to the executed firmware in response to the hardware of the apparatus having been initiated by the first firmware or the second firmware wherein the first OS and the second OS are stored in a storage device, wherein the micro-controller, during a detection time period, when detecting the selection signal corresponding to the first button comprises a toggling, determines to activate the first ROM; and when detecting the selection signal corresponding to the second button comprises a toggling, determines to activate the second ROM, wherein the ROM other than the determined ROM is disappeared from a system, and data of the ROM other than the determined ROM cannot be accessed.

* * * * *